No. 838,114. PATENTED DEC. 11, 1906.
W. F. HISE.
NUT LOCK.
APPLICATION FILED AUG. 13, 1906.
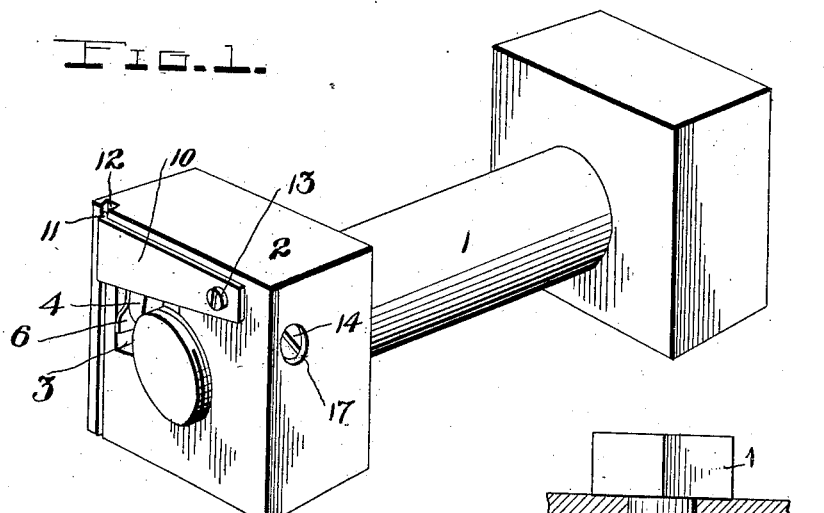
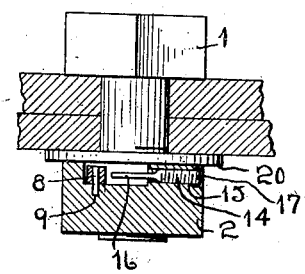
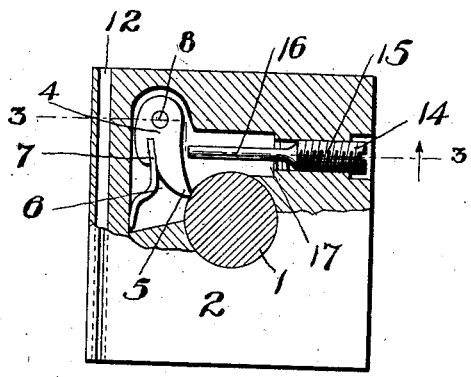
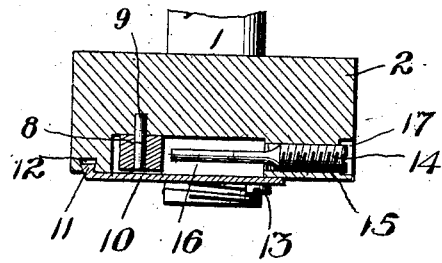
Witnesses
Chas. L. Griesbauer.
L. O. Hilton
Inventor
W. F. Hise.
by H. B. Willson & Co.
Attorneys

UNITED STATES PATENT OFFICE.

WILLIAM F. HISE, OF SUGARGROVE, WEST VIRGINIA.

NUT-LOCK.

No. 838,114. Specification of Letters Patent. Patented Dec. 11, 1906.

Application filed August 13, 1906. Serial No. 330,493.

*To all whom it may concern:*

Be it known that I, WILLIAM F. HISE, a citizen of the United States, residing at Sugargrove, in the county of Pendleton and State of West Virginia, have invented certain new and useful Improvements in Nut-Locks; and I do declare the following to be a full, clear, and exact description of the invention, such as will enable others skilled in the art to which it appertains to make and use the same.

This invention relates to improvements in devices for locking nuts upon their bolts or the like; and it consists of the novel construction, combination, and arrangement of parts hereinafter described and claimed.

The object of the invention is to provide a simple, inexpensive, and practical device of this character which will effectively lock a nut against rotation upon the bolt and which when desired will enable the nut to be readily removed from the bolt.

The above and other objects, which will appear as the nature of the invention is better understood, are accomplished by the construction illustrated in the accompanying drawings, in which—

Figure 1 is a perspective view of a nut locked upon its bolt in accordance with the invention. Fig. 2 is an end view, partly in section, of the nut and bolt. Fig. 3 is a detail sectional view taken on the plane indicated by the line 3 3 in Fig. 2, and Fig. 4 is a detail sectional view showing another way in which the locking-nut may be used.

Referring to the drawings by numeral, 1 denotes a bolt having a threaded end upon which is secured the nut 2. The latter may be of any size and shape and in its outer face is formed a substantially rectangular recess or cavity 3, which opens into the centrally-threaded opening in the nut through which the bolt passes. In the recess 3 is mounted a pivoted dog or pawl 4, the sharp end 5 of which is adapted to bite the threads of the bolt 2. The pawl or dog 4 is preferably made of very hard metal, and its disposition in the recess 3 is such that it is caused to bite deeper into the threads of the bolt when the latter is screwed out of the nut or the nut is screwed off of the bolt. The pawl is forced against the threads of the bolt by a small leaf-spring 6, having one of its ends secured in a kerf 7 in the pawl and its other free end bearing against one of the walls of the recess 3, as clearly shown in Fig. 2 of the drawings.

The pawl is pivotally mounted in the recess by a pin or stud 8, which it carries and which enters a seat or bearing 9, formed in the bottom of the recess 3, as will be seen upon reference to Fig. 3 of the drawings. The pawl is retained in the recess 3, and it is pivoted in this bearing 9 by a cover-plate 10, removably secured upon the outer face of the nut. This plate has at one of its ends a right-angularly-disposed dovetail flange or rib 11, adapted to slidably engage a similarly-shaped groove 12, formed in the outer face of the nut adjacent to one of its edges. The opposite end of the plate is secured by a screw 13, which passes through an opening in said plate and into a threaded opening in the nut, as will be readily understood. In order to permit the nut to be readily removed from the bolt, a releasing-screw 14 is provided. The latter extends transversely into the nut and has a threaded portion 15 at its outer end and a reduced portion 16 at its inner end. This reduced portion extends through a passage or opening 17, formed in the nut and opening into the recess 3, so that said end 16 of the screw which projects into said recess may engage the pawl 4 and force the latter outwardly against the tension of its spring and away from the threads of the bolt.

If desired, the plate 10 may be dispensed with, and in that event a washer 20 is placed upon the bolt against the object through which it passes, and the nut is then screwed upon the bolt, so that its recessed side is turned inwardly, as shown in Fig. 4 of the drawings. In this event the washer 20 takes the place of the plate 10 and serves to hold the pawl and its pivot in position.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention as defined by the appended claim.

Having thus described my invention, what I claim as new, and desire to secure by Letters Patent, is—

The combination with a bolt having a threaded end, of a nut screwed thereon and formed in its outer face with a recess opening into the central threaded opening in the nut, a pivoted spring-actuated pawl in said recess in engagement with the threads of the bolt, a retaining-plate for said pawl adapted to engage the outer face of the nut and having at one end a dovetail rib to enter a similarly-shaped groove in the nut and a screw passing through the other end of said plate and into the nut.

In testimony whereof I have hereunto set my hand in presence of two subscribing witnesses.

WILLIAM F. HISE.

Witnesses:
 IRA WILFENG,
 AMBROSE SMITH.